(12) United States Patent
Vermeer

(10) Patent No.: US 8,721,769 B2
(45) Date of Patent: May 13, 2014

(54) DEVICE FOR COMPRESSING AND DRYING GAS AND A METHOD APPLIED THEREBY

(75) Inventor: Constantijn Friso Vermeer, Antwerp (BE)

(73) Assignee: Atlas Copco Airpower, N.V., Wilrijk (BE)

( * ) Notice: Subject to any disclaimer, the term of this patent is extended or adjusted under 35 U.S.C. 154(b) by 165 days.

(21) Appl. No.: 13/504,223

(22) PCT Filed: Oct. 26, 2010

(86) PCT No.: PCT/BE2010/000072
§ 371 (c)(1),
(2), (4) Date: Apr. 26, 2012

(87) PCT Pub. No.: WO2011/050423
PCT Pub. Date: May 5, 2011

(65) Prior Publication Data
US 2012/0222549 A1   Sep. 6, 2012

(30) Foreign Application Priority Data

Oct. 30, 2009 (BE) .................................. 2009/0666

(51) Int. Cl.
| | | |
|---|---|---|
| *B01D 53/047* | (2006.01) | |
| *B01D 53/26* | (2006.01) | |
| *B01D 53/06* | (2006.01) | |
| *F04D 29/58* | (2006.01) | |
| *F24F 3/14* | (2006.01) | |

(52) U.S. Cl.
CPC ............... *B01D 53/261* (2013.01); *B01D 53/06* (2013.01); *B01D 2259/40001* (2013.01); *B01D 2259/4009* (2013.01); *B01D 2259/402* (2013.01); *F04D 29/5826* (2013.01); *F24F 3/1423* (2013.01)

USPC ................... 95/117; 95/113; 95/123; 95/125; 95/148; 96/125; 96/144; 34/80; 34/472; 34/473

(58) Field of Classification Search
CPC ................. B01D 53/06; B01D 53/261; B01D 2259/40001; B01D 2259/4009; B01D 2259/402; F04D 29/5826; F24F 3/1423
USPC .............. 95/113, 123, 125, 148; 96/125, 144; 34/80, 472, 473
See application file for complete search history.

(56) References Cited

U.S. PATENT DOCUMENTS

| | | | |
|---|---|---|---|
| 3,950,154 A | | 4/1976 | Henderson et al. |
| 4,480,393 A * | | 11/1984 | Flink et al. ...................... 34/468 |
| 6,171,377 B1 | | 1/2001 | Henderson |
| 6,733,571 B1 * | | 5/2004 | Arquin et al. ..................... 95/90 |
| 6,890,376 B2 * | | 5/2005 | Arquin et al. .................... 96/134 |
| 7,449,054 B2 * | | 11/2008 | Rabellino et al. ............... 96/126 |
| 8,608,831 B2 * | | 12/2013 | Vermeer ......................... 95/113 |
| 2003/0188542 A1 | | 10/2003 | Vertriest |
| 2010/0229719 A1 | | 9/2010 | Huberland et al. |

FOREIGN PATENT DOCUMENTS

| | | |
|---|---|---|
| DE | 102006022293 A1 | 11/2007 |
| GB | 1300744 A | 12/1972 |
| JP | 2-45128 U | 3/1990 |
| WO | 0238251 A1 | 5/2002 |
| WO | 2009043123 A1 | 4/2009 |

OTHER PUBLICATIONS

International Search Report for PCT/2010/000072, May 25, 2011.
Japanese Office Action for JP 2012-535552 dated Jan. 7, 2014, and English translation thereof.

* cited by examiner

*Primary Examiner* — Christopher P Jones
(74) *Attorney, Agent, or Firm* — Bacon & Thomas, PLLC

(57) ABSTRACT

Device for compressing and drying gas includes a compressor and a dryer using a drying agent for drying gas connected thereto. The compressor includes two or more compressor elements with an inlet and an outlet which are connected together in series to form a first low-pressure stage. One or more subsequent high-pressure stages are each connected with their inlet to the outlet of a previous compressor element via a pressure pipe and an outlet pipe in which an after cooler is incorporated. The dryer has a drying section and a regeneration section. The drying section is filled with a drying agent for drying the gas and has an inlet connected to the outlet pipe of the compressor device, and an outlet that supplies compressed and dried gas. The regeneration section dries moist drying agent by a regeneration gas which is guided there via an inlet and an outlet with a regeneration pipe connected to the inlet. At least part of the regeneration gas is heated by a gas-gas heat exchanger with a primary part incorporated in a regeneration pipe and a secondary part that is fed by a pressure side of the compressor element. The gas-gas heat exchanger is provided with its secondary part in the pressure pipe extending between the low-pressure stage and the high-pressure stage.

19 Claims, 6 Drawing Sheets

DEVICE FOR COMPRESSING AND DRYING GAS AND A METHOD APPLIED THEREBY

BACKGROUND FIELD

The present invention relates to a device for compressing and drying gas.

RELATED ART

Such devices are already known that are composed of a compressor device with a dryer of the type that makes use of a drying agent or desiccant for drying gas connected thereto, whereby the compressor device contains, on the one hand, two or more compressor elements with an inlet and outlet that are connected together in series to form a first low-pressure stage, and one or more subsequent high-pressure stages that are each connected with their inlet to the outlet of a previous compressor element via a pressure pipe, and on the other hand an outlet pipe in which an aftercooler is incorporated, and whereby the dryer is provided with a drying section and a regeneration section.

The drying section is filled with a drying agent for drying the gas that is guided there through, and to this end has an inlet that connects to the above-mentioned outlet pipe of the compressor device, and an outlet that also acts as an exit of the device for supplying compressed and dried gas to a downstream network to which consumers can be connected.

When the compressed gas to be dried flows through the drying agent in the drying section, moisture is taken up out of the gas into the drying agent by absorption or adsorption.

In the regeneration section, the drying agent, which has already been used for drying gas and which is saturated or partially saturated with moisture that has been adsorbed from the gas to be dried, is regenerated.

The drying agent is dried in the regeneration section by means of a regeneration gas that is guided through it via an inlet and an outlet of this regeneration section.

If a "heat of compression" dryer (HOC dryer) is used, the regeneration gas is branched off directly from the above-mentioned outlet pipe of the compressor device, at a location upstream from the aftercooler, for example on the outlet of the last compressor element, where the branched-off regeneration gas is relatively moist, but due to the high temperature presents a sufficiently low relative humidity to absorb moisture from the drying agent to be regenerated when the regeneration gas is guided through the regeneration section.

A disadvantage of known devices is that after regeneration the drying agent still contains a certain quantity of moisture, such that this drying agent, when it is used at a later stage to dry the compressed gas, can only absorb a relatively limited quantity of moisture from this gas to be dried, and the dried gas consequently has a residual moisture content when leaving the device.

The capacity of the drying agent to absorb moisture is thus limited, such that the drying agent from the drying section will have to be regenerated sooner.

In known devices, the compressed gas is generally cooled after each compression stage in an intercooler or aftercooler for the good functioning of the following stage or of the subsequent dryer, whereby the heat that is thereby extracted from the gas is lost energy which also determines the price of the compressed and dried gas supplied.

The intercoolers and aftercoolers that are used also determine the cost of the device as a whole.

The invention aims at an improvement of the known devices for compressing and drying gas which does not contain one or more of the above-mentioned and/or other disadvantages.

BRIEF SUMMARY

To this end, the invention relates to a device as described above, whereby at least a part of the regeneration gas is heated by means of a gas-gas heat exchanger with a primary part which is incorporated into a regeneration pipe, and a secondary part that is fed by a pressure side of an above-mentioned compressor element, and whereby the above-mentioned gas-gas heat exchanger is provided with its secondary part in the pressure pipe extending between the above-mentioned low-pressure stage and the subsequent high-pressure stage.

The advantage of such a device is that, by further heating the regeneration gas, the partial pressure of the water present in the regeneration gas is further reduced, which in practice comes down to the heated regeneration gas being able to absorb more moisture from the drying agent than without additional heating and the regenerated drying agent will ultimately be drier.

Due to the fact that the regenerated drying agent, which is used in the drying section, is drier from the start, the regenerated drying agent will be able to absorb more moisture from the gas to be dried during the drying phase, such that the compressed gas supplied will be dryer when leaving the device and there is thus a favourable effect on the drying capacity.

The drying agent in the drying section will thus have to be regenerated less quickly.

At least a part of the heat needed to heat the regeneration gas is also recovered from the compression heat of the compressor device, whereby the gas-gas heat exchanger used to this end can entirely or partially take the place of one or more coolers that are used in the known devices for cooling compressed gas.

Thus the energy extracted from the compressed gas can be usefully employed for even more intensive drying of the drying agent in the regeneration section, which benefits the cost of the supplied compressed and dried gas, as less energy is lost.

The gas supplied will thus be drier and can also be produced at a more favourable price.

The aim is that the temperature of the regeneration gas at the inlet of the regeneration section is a maximum, so that as much heat as possible can be recovered from the compressed gas, and that also the effect on the drying of the drying agent in the regeneration zone is a maximum.

Preferably the regeneration gas is branched off from the gas compressed by the device by means of the above-mentioned regeneration pipe in which the primary part of the heat exchanger is incorporated, and which regeneration pipe connects the inlet of the regeneration section to the above-mentioned outlet pipe of the compressor device or the outlet of the drying section.

According to a preferred characteristic of the invention, two successive regeneration phases are used, i.e. a first regeneration phase for which regeneration gas is supplied via a first regeneration pipe, and a second subsequent regeneration phase to further dry the drying agent, and for which regeneration gas is supplied via a second regeneration pipe, and whereby an above-mentioned gas-gas heat exchanger is provided in at least one of both regeneration pipes.

The second quantity of regeneration gas supplied via the second regeneration pipe preferably presents a lower relative humidity than the first quantity of regeneration gas supplied via the first regeneration pipe, for example due to this second quantity of regeneration gas presenting a higher temperature than the above-mentioned first quantity and/or because the second quantity of gas has already been dried.

The above-mentioned advantages of the invention are thus accentuated even stronger.

Preferably the installation is applied to a device with a dryer of the rotating type, with a drum filled with a drying agent, which due to the rotation of the drum is first guided through a drying section and then through a first and possibly also a second regeneration section.

The invention also relates to a method for compressing and drying gas by means of a device, which contains a compressor device and a dryer of the type that uses a drying agent for drying gas connected thereto, whereby the compressor device compresses the gas in two or more successive stages in two or more compressor elements, respectively a low-pressure stage and one or more subsequent high-pressure stages, and leads the compressed gas through the dryer via an outlet pipe in which an aftercooler is incorporated to dry this compressed gas and which is provided with a drying section to this end which is filled with a drying agent through which the gas is guided, and which has an outlet that acts as an exit for supplying compressed and dried gas, whereby the dryer also has a regeneration section for drying the moist drying agent by means of a regeneration gas that is guided through it via an inlet and an outlet, characterised in that the method consists of at least a part of the regeneration gas being heated by means of a gas-gas heat exchanger with a primary part through which the regeneration gas flows and a secondary part that is fed by a pressure side of the above-mentioned compressor element that forms the low-pressure stage.

DESCRIPTION OF THE DRAWINGS

With the intention of better showing the characteristics of the invention, hereafter, some preferred embodiments are described by way of example, without any limiting nature, of a device according to the invention for compressing and drying gas, with reference to the accompanying drawings, wherein:

FIGS. 2 to 6 show variants of devices according to the invention.

DETAILED DESCRIPTION OF THE PREFERRED EMBODIMENTS OF THE INVENTION

Figure 1:
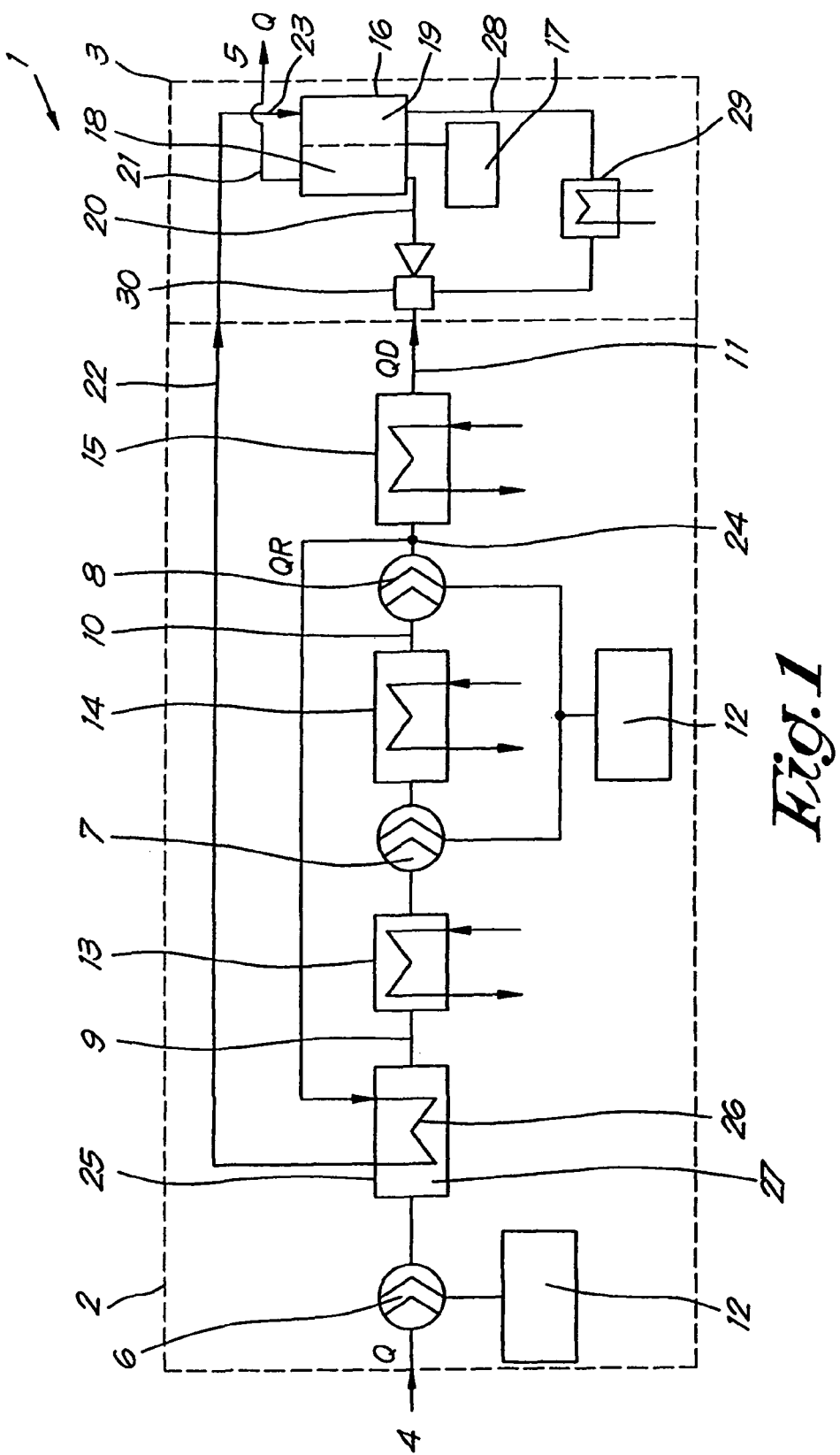
FIG. 1 schematically shows a device according to the invention for compressing and drying gas.
Figure 9:
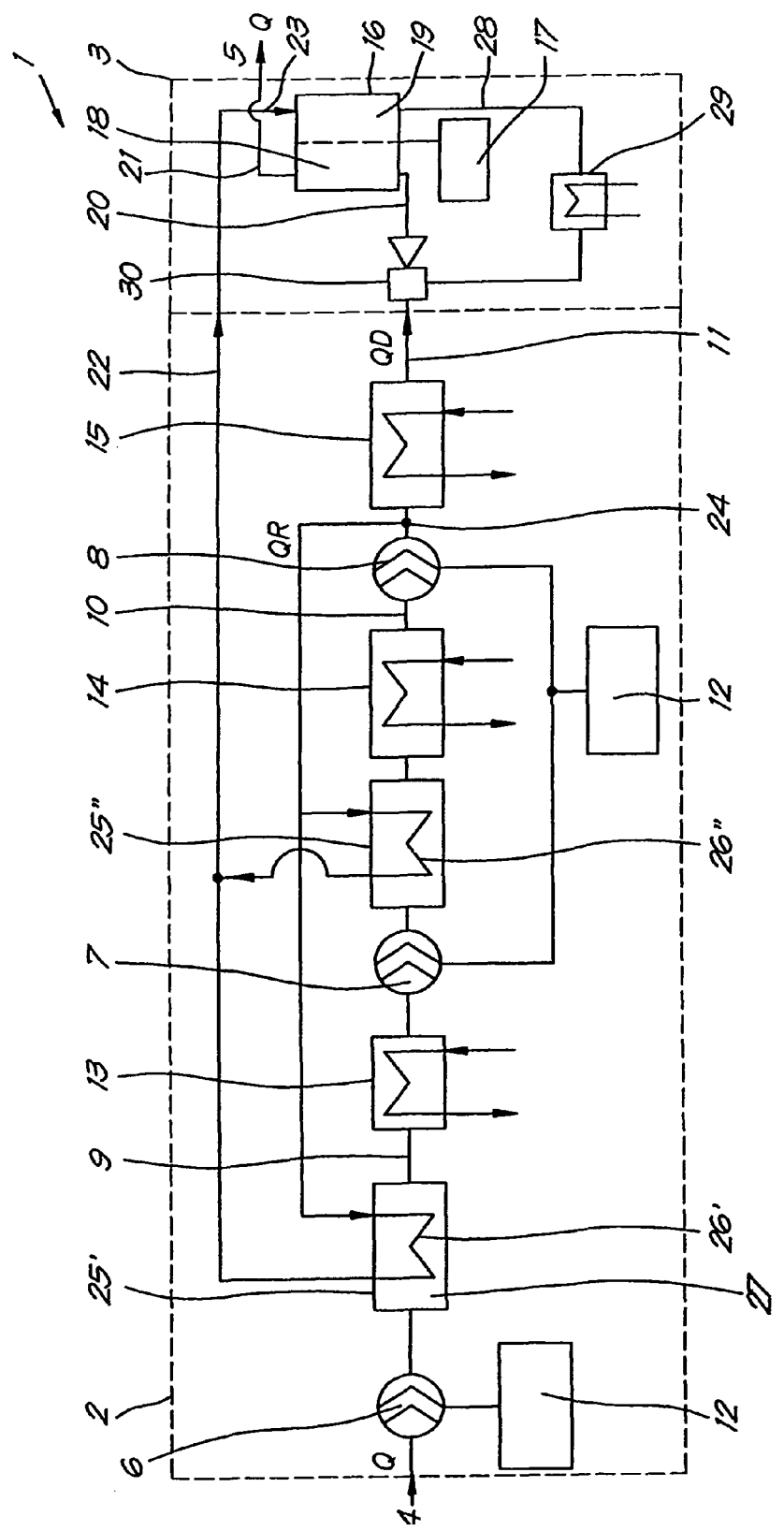

The device 1 of FIG. 1 is a device for compressing and drying gas which is composed of a compressor device 2 and a dryer 3 of the type that makes use of a drying agent to dry gas, and which has an inlet 4 for the gas to be compressed and dried and an exit 5 for supplying compressed and dried gas and to which a downstream consumer network is connected, which is not shown in the figures.

The compressor device 2 in this case contains three compressor elements, 6, 7 and 8 respectively, that are connected in series to each other to form a first low-pressure stage 6, whose inlet is connected to the above-mentioned inlet 4 and two subsequent high-pressure stages 7 and 8 that each have their inlet connected to the outlet of a previous compressor element 6 and 7 via a pressure pipe 9 and 10 respectively.

The last high-pressure compressor element 8 is connected to the inlet of the dryer 3 via an outlet pipe 11.

Each compressor element is driven by means of a motor 12, which, for the compressor elements 7 and 8, is formed by a shared motor 12, but which is not necessary. In a preferred embodiment, both motors 12 have approximately the same power, although this is not necessary for the invention.

Downstream of each compressor element 6, 7 and 8 is provided a cooler to cool the gas compressed by the compressor element concerned, respectively, two intercoolers 13 and 14 and an aftercooler 15.

In the example of FIG. 1 these coolers 13 to 15 are liquid-gas coolers with a primary part through which the gases to be cooled are guided, and which is incorporated in a pressure pipe 9, 10 or in the outlet pipe 11 for this purpose, and a secondary part through which a coolant such as water is guided.

However, it is not excluded that these coolers can be gas-gas coolers, whereby for example the surrounding air is used as a coolant which is blown over the coolers by means of a fan.

The dryer 3 is for example a rotary dryer with a rotating drum that is rotated in a known way, driven by a motor 17 and which is filled with a drying agent that is able to absorb moisture and release it again.

When the drum 16 rotates, the drying agent in the drum 16 is alternately sent through a drying section 18 and through a regeneration section 19, whereby the gas coming from the compressor device 2 is guided through the drying section 18 to dry this gas.

To this end the inlet 20 of the drying section 18 is connected to the outlet pipe 11 of the compressor device 2, and more specifically to the part of the outlet pipe 11 downstream of the aftercooler 15.

The outlet 21 of the drying section 18 acts as the above-mentioned exit 5 of the device 1 to supply compressed and dried gas.

When the gas flows through the drying section 18 moisture is taken out of the gas into the drying agent by absorption and/or adsorption.

The speed of rotation of the motor 17 is controlled such that, when the drying agent leaves the regeneration section 19, this drying agent is fully regenerated.

In the regeneration section 19, the drying agent is regenerated by sending a gas flow through it that can absorb moisture from the drying agent in this regeneration section 19 and which, in the case of FIG. 1 of the outlet pipe 11, is connected to the inlet 23 of the regeneration section 19 through a regeneration pipe 22, and which in this example is branched off at a place 24 upstream from the aftercooler 15.

The gas flow QR, that is branched off for regeneration, preferably amounts up to about 40% of the gas flow Q that is taken in at the inlet 4.

According to the invention the branched-off gas QR is first heated in a gas-gas heat exchanger 25 with a primary part 26 that is incorporated in the above-mentioned regeneration pipe 22, and a secondary part 27 through which compressed gas is guided that comes from the compressor device 2, more specifically from the low-pressure compressor element 6, and to this end is incorporated in the pressure pipe 9.

The heat exchanger 25 is dimensioned such that the temperature of the regeneration gas at the inlet 23 of the regeneration section 19 is as high as possible in order to obtain a partial pressure of the water present in the regeneration gas that is lower than the partial pressure of the water present in the drying agent in the regeneration section 19, such that this regeneration gas can absorb moisture from the drying agent, and this all the more so as the above-mentioned temperature at the inlet 23 is high and consequently the partial pressure of the water in the regeneration gas is low.

Preferably the heat exchanger 25 will be dimensioned such that the temperature of the regeneration gas at the inlet 23 of the regeneration section 19 is situated between 130 and 150° C., and preferably around 140° C.

The flow of regeneration gas QR that leaves the regeneration section 19 via the outlet 28 of the regeneration section is either lost or preferably, after cooling in a heat exchanger 29, mixed via an ejector 30 with the flow QD originating from the compressor device 2, and together with this flow QD is guided through the drying section 18.

The operation of the device 1 is very simple and follows from the description above.

Gas is sucked in through the inlet 4 and compressed to increasingly higher pressures in successive stages.

After each compression stage 6, 7 and 8 the gas is cooled by means of a heat exchanger 13, 14, and 15 in order to reduce the temperature for greater efficiency of the subsequent compression stage or for more efficient drying of the gas in the drying section 18 of the dryer 3.

In the embodiment of FIG. 1, where the two motors 12 have approximately the same power, immediately after the first compressor element 6 the temperature will be much higher than the temperature at the branch-off point 24, such that the temperature difference can for example be in the order of magnitude of 50 to 75° C.

This temperature difference is then used according to the invention to heat up the regeneration gas branched off from point 24, in order to be able to regenerate the drying agent more efficiently.

In this way the compression heat from the first low-pressure stage 6 is recovered in order to usefully heat up the regeneration gas, this in contrast to the situation with the known devices whereby this heat is completely lost to a coolant that flows through the intercooler 13.

This means that at least part of the normally lost heat is used usefully to optimise the operation of the dryer 3 and that the intercooler 13 can be entirely or partially eliminated.

In a device 1 with a power of approximately 350 kW and a gas flow Q of around 1000 liters per second, for example a heat exchanger 25 of 25 kW can be used with a favourable effect.

This power also yields a dual gain in the form that no external heating is needed to heat up the regeneration gas, and in the fact that the recovered heat does not have to be removed via the intercooler 13 such that this can also be smaller.

With a heat exchanger 25 with a power of 25 kW, 50 kW of energy losses will thus be saved after the first compression stage 6.

FIG. 2 shows an alternative embodiment in which the gas-gas heat exchanger 25 is divided into two gas-gas heat exchangers 25' and 25" which are each separately incorporated into a pressure pipe 9, 10 of a different compressor element 6 or 7, and this upstream from the intercoolers 13 and 14, such that the heat exchangers 25' and 25" act as a precooler for the intercoolers 13 and 14.

The primary parts 26' and 26" of these heat exchangers 25' and 25" are thereby incorporated in a parallel configuration in the regeneration pipe 22.

A possible advantage with respect to the embodiment of FIG. 1 is that even higher temperatures can be reached at the inlet 23 of the regeneration section 19, at least when the outlet temperature of the compressor elements 6 and 7 is approximately the same. In such a configuration it is perhaps more feasible to integrate the gas-gas heat exchangers 25' and 25" in the existing intercoolers 13 and 14.

Figure 3:
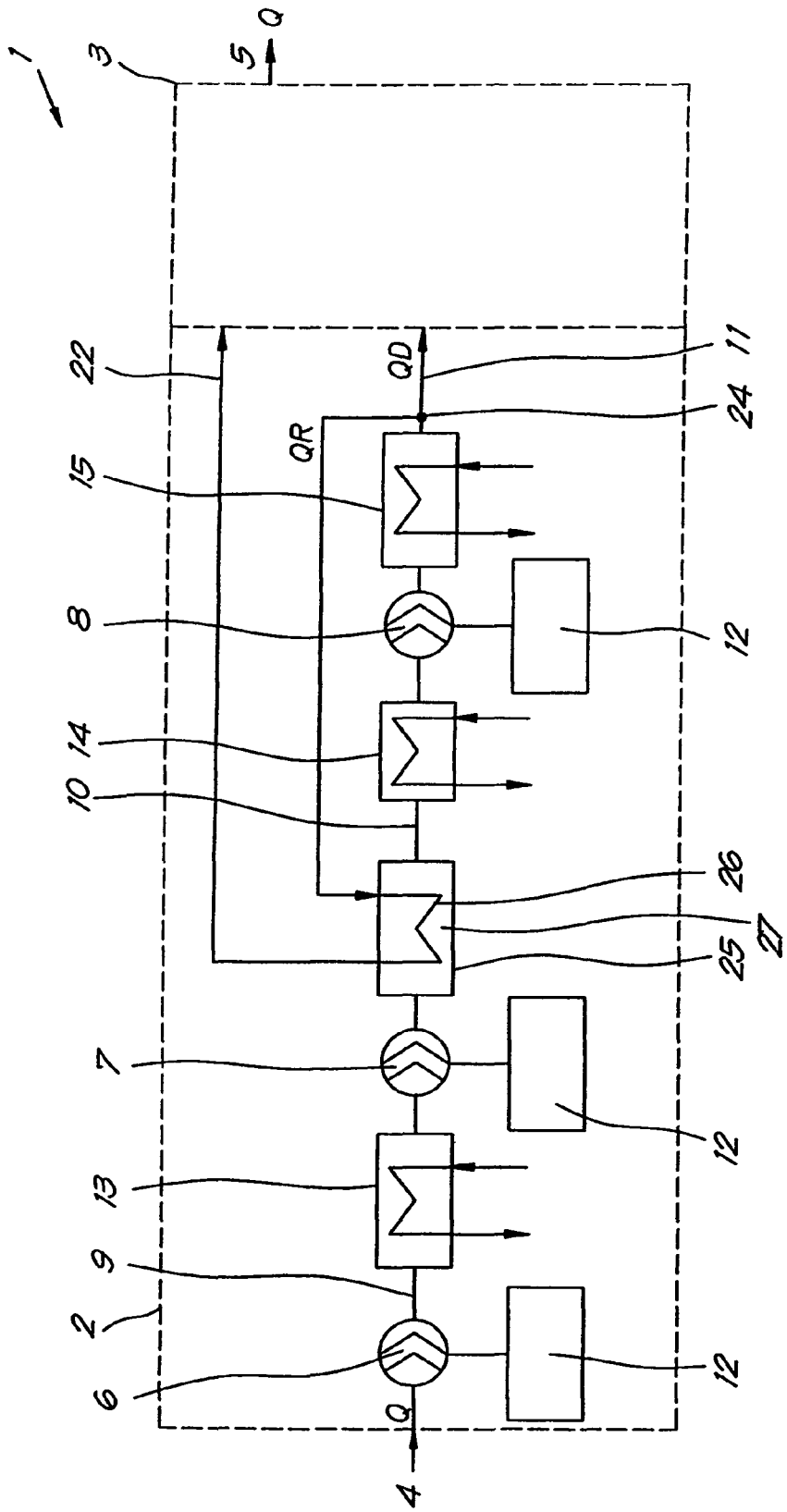

FIG. 3 shows a variant of a device 1 according to the invention, whereby in this case the shared motor 12 of the compressor elements 7 and 8 is replaced by two separate motors, which, for example, both have the same power as the motor 12 of the first compressor element 6, and whereby the regeneration gas is branched off downstream from the aftercooler 15.

In this case the temperatures at the outlets of the compressor elements are different to the situation in FIG. 1, and taking this into account it has been chosen to branch off the regeneration gas at a branch-off point 24 downstream from the aftercooler 15, and in the framework of the invention to heat up this regeneration gas by means of a gas-gas heat exchanger 25, which this time has its secondary part 27 incorporated in the pressure pipe 10 between the second and third compressor elements, 7 and 8 respectively, instead of in the pressure pipe 9 between the first and second compressor elements 6 and 7.

The heat exchanger 25 is incorporated in this pressure pipe 10 together with the intercooler 14 and takes over part of the function of this intercooler 14, which can thus be smaller.

The operation is further completely analogous to the embodiment of FIG. 1.

The embodiment where the regeneration gas is branched off downstream from the aftercooler 15 ensures a lower partial pressure of the water in the regeneration gas. Due to the gas from the last compressor element 8 having first gone through an aftercooler 15, part of the water will be separated by condensation in the aftercooler 15. The gas downstream from the aftercooler 15 thus contains considerably less moisture than upstream from the aftercooler 15. This of course has a more favourable effect on the regeneration.

The gas-gas heat exchanger 25 could thus also be placed just after, and thus downstream from, the last high-pressure stage in the following order: compressor element 8—gas-gas heat exchanger 25—aftercooler 15—regeneration branch-off point 24.

Figure 4:
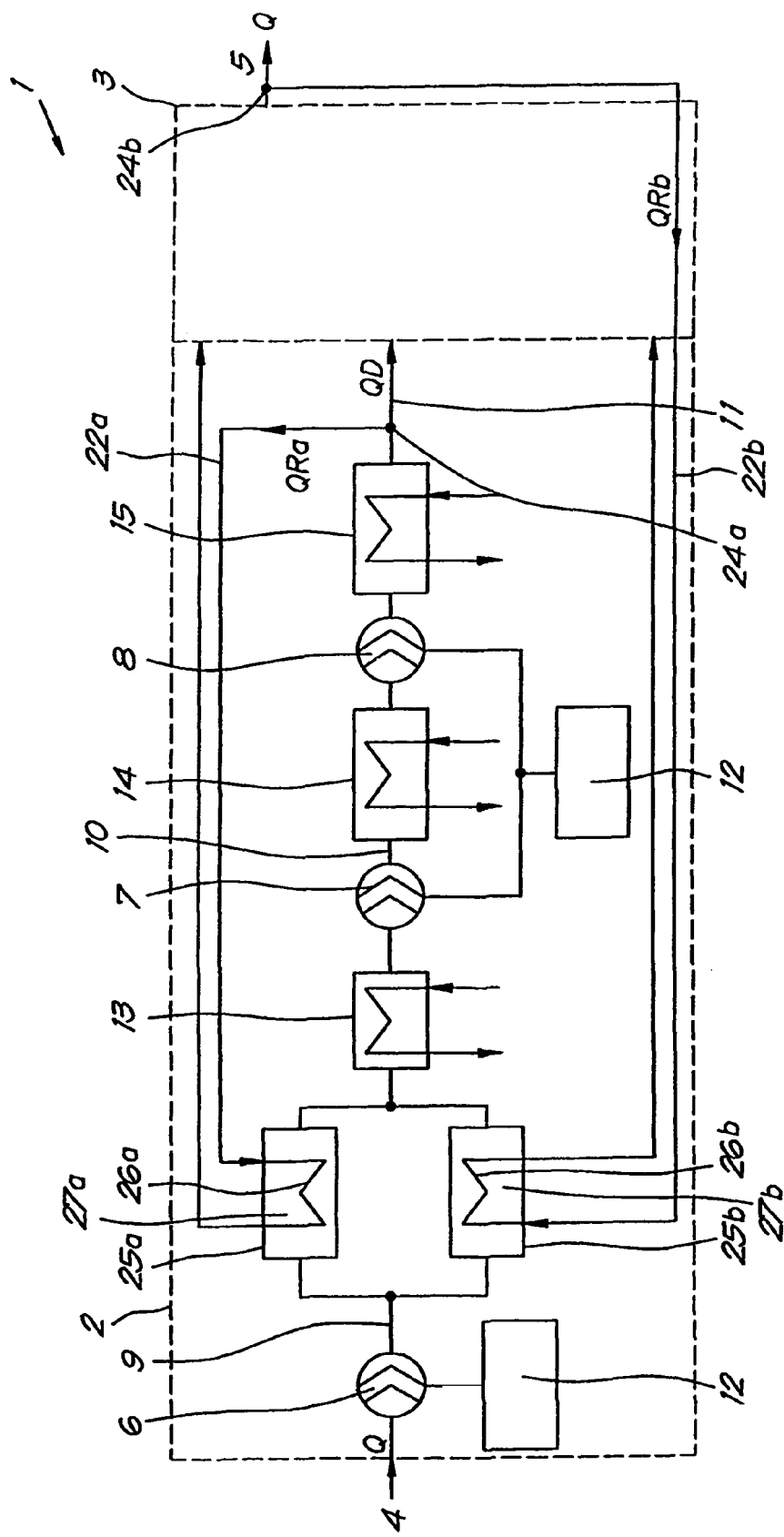

FIG. 4 shows another variant of a device 1 according to the invention, whereby in this case two successive regeneration phases are applied with respect to the embodiment of FIG. 1.

A first regeneration is applied on the basis of a first flow QRa of regeneration gas that is branched off via a first regeneration pipe 22a from a branch-off point 24a immediately after the aftercooler 15, from the compression gas of the compressor device 2 and heated by means of a first heat exchanger 25a whose secondary part 27a is incorporated in the pressure pipe 9.

A second regeneration is applied on the basis of a second flow QRb of regeneration gas that is branched off via a second regeneration pipe 22b, at another branch-off point 24b, directly from the dry compressed air at the exit 5 after the dryer 3 and heated by means of a second heat exchanger 25b whose secondary part 27b is incorporated in the same pressure pipe 9.

Both heat exchangers 25a and 25b are incorporated in a parallel configuration in the pressure pipe together with the intercooler 13.

The flow QRa is situated for example in the order of magnitude of 40% of the gas flow Q sucked in by the device 1, while the flow QRb is in the order of magnitude of 10% of this flow Q.

The heat exchangers are preferably dimensioned and connected such that the temperature of the regeneration gas at the respective inlets of the regeneration sections is as high as possible for both regeneration phases.

In the second regeneration phase the drying agent is further dried in the regeneration section 19 compared to the drying in the first regeneration phase. As a result, the regenerated drying agent can take up more moisture from the gas in the drying section 18, which is of course beneficial.

Figure 5:
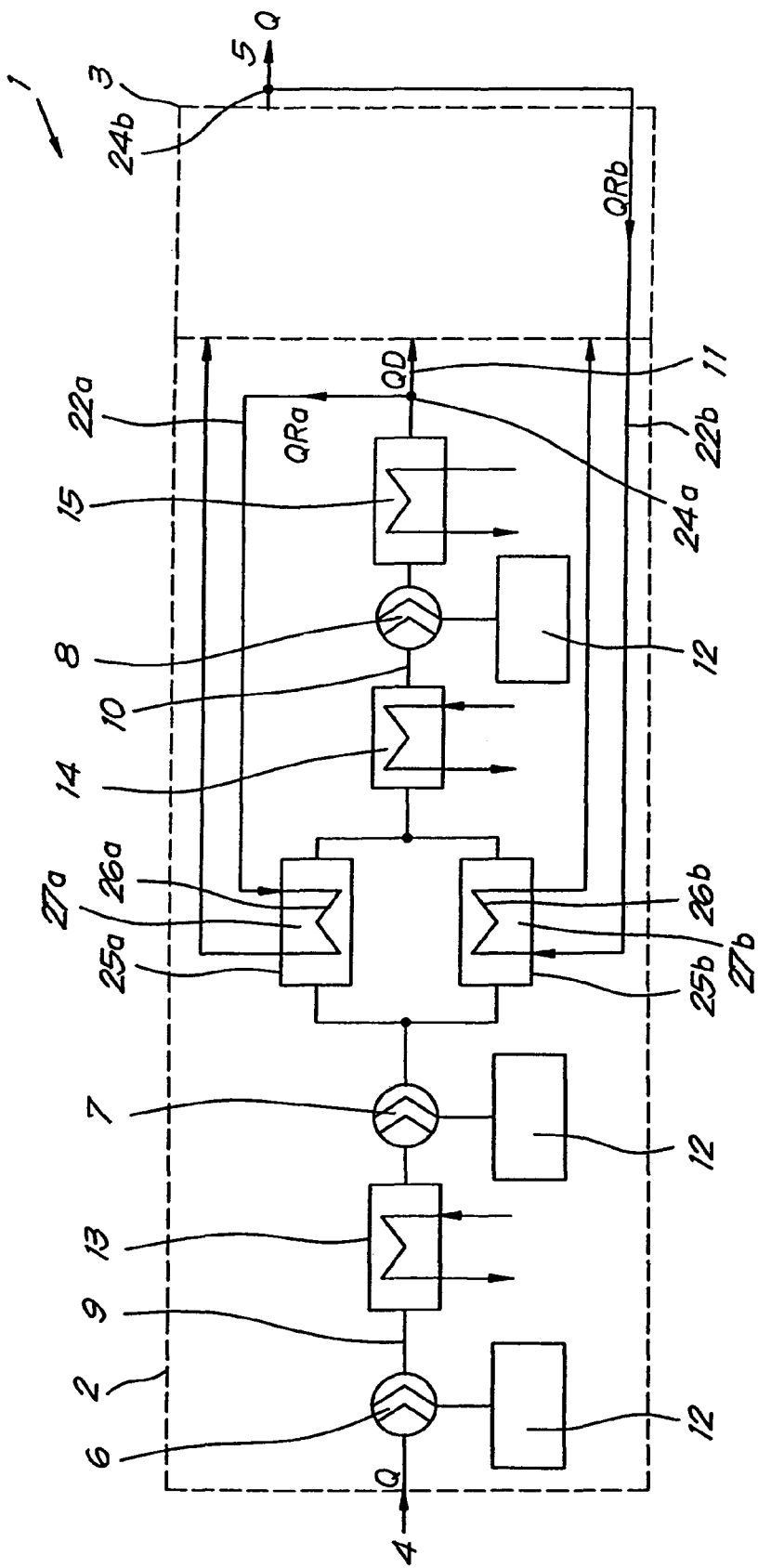

FIG. 5 shows another embodiment that differs from that of FIG. 4 in the fact that the two high-pressure stages 7 and 8 are each driven by a separate motor 12 instead of by a shared motor 12, and that the heat exchangers 25a and 25b are incorporated in the pressure pipe 10 between these two high-pressure compressor elements 7 and 8.

As a variant to FIG. 5 it is not ruled out that the heat exchangers 25a and 25b are each incorporated separately in a pressure pipe 9, 10 of a different compressor element 6 or 7, and thus in a pressure pipe with a different pressure level, whereby for example heat exchanger 25a is incorporated in pressure pipe 9 and heat exchanger 25b in the pressure pipe 10.

Figure 6:
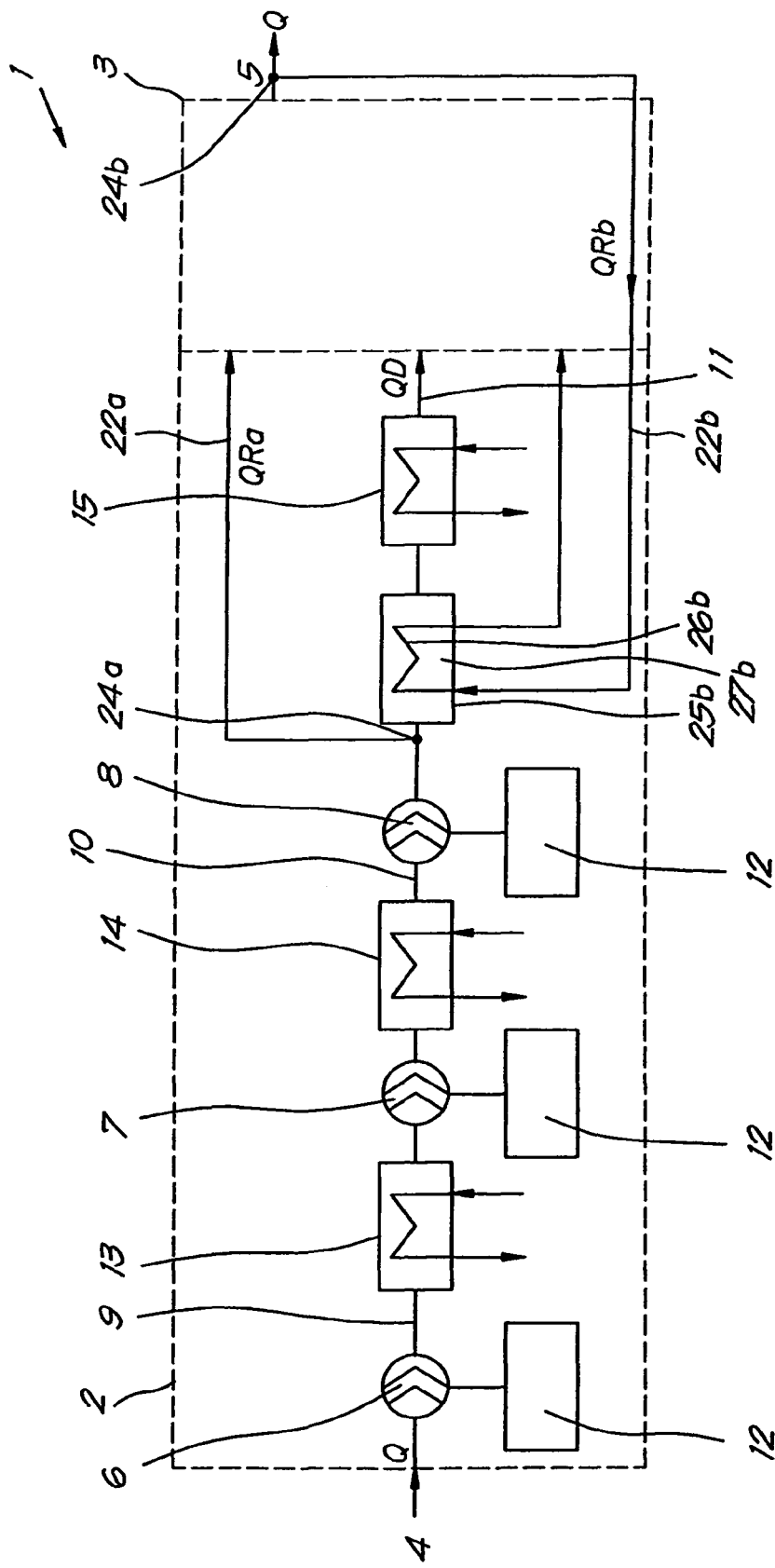

FIG. 6 shows a variant of a device 1 according to the invention, whereby in this case two successive regeneration phases are also applied, but where only the regeneration gas QRb for the second regeneration is heated by means of the compression gases of the compressor device 2 by means of a gas-gas heat exchanger 25b that is incorporated in the outlet pipe 11 of the compressor device 2.

It is clear that, depending on the situation of the compressor device 2, a choice will have to be made on the place where the heat exchanger 25 can be incorporated and the place 24 where the regeneration gas is branched off, as well as its flow rate QR, and that, in case of two regeneration phases, the heat exchangers 25a and 25b do not necessarily have to be incorporated in the same pressure pipe or outlet pipe.

Although the invention has been described on the basis of a compressor device 2 with three compression stages, the invention can be applied just as well to a compressor device 2 with only two compressor elements that respectively forming a low-pressure stage and a high-pressure stage, respectively, or with more than three compressor elements.

In each of the examples shown, the regeneration gas is branched off, either from the outlet pipe 11 or from the outlet 21 of the drying section 18, but according to the invention it is not ruled out that this regeneration gas is supplied from a separate source of regeneration gas and thus is not branched off from the device 1.

Also, the dryer does not necessarily have to be of the rotating type, but can be any other type of dryer with a drying section and a regeneration section.

The present invention is by no means limited to the embodiments described as an example and shown in the drawings, but a device according to the invention for compressing and drying gas can be realised in all kinds of shapes and dimensions, without departure from the scope of the invention.

The invention claimed is:

1. A device for compressing and drying gas, comprising:
a compressor device and a dryer that uses a drying agent for drying gas connected to the compressor device;
the compressor device comprising two or more compressor elements each having an inlet and an outlet, said inlets and outlets being connected together in series to form a first low-pressure stage and one or more subsequent high-pressure stages which are each connected at their inlet to the outlet of a previous compressor element via a pressure pipe;
an outlet pipe in which an aftercooler is provided;
said dryer having a drying section and a regeneration section, said drying section being filled with a drying agent for drying a gas that is guided there through, and an inlet which is connected to said outlet pipe of the compressor device and an outlet defining an exit arranged to supply compressed and dried gas;
said regeneration section arranged to enable moist drying agent to be dried by a regeneration gas which is guided there through via an inlet, an outlet, and a regeneration pipe connected to the inlet;
a gas-gas heat exchanger arranged to heat at least part of the regeneration gas, said gas-gas heat exchanger comprising a primary part which is disposed in the regeneration pipe and a secondary part that is fed by a pressure side of a compressor element; and
said secondary part of said gas-gas heat exchanger being disposed in the pressure pipe extending between the low-pressure stage and the subsequent high-pressure stage.

2. The device according to claim 1, wherein at least a part of the regeneration gas is branched off from the gas compressed by the device by said regeneration pipe in which the primary part of the heat exchanger is incorporated, and wherein said regeneration pipe connects the inlet of the regeneration section to said outlet pipe of the compressor device or to the outlet of the drying section.

3. The device according to claim 1, wherein the heat exchanger is located upstream from the aftercooler.

4. The device according to claim 1, wherein the regeneration gas is branched off from the outlet pipe of the compressor device and the flow of the branched-off regeneration gas is about 40% of a gas flow that is compressed by the compressor device.

5. The device according to claim 4, wherein the regeneration pipe is branched off at a tapping point upstream or downstream from the aftercooler, depending on the temperatures of the compressed gas before and after the aftercooler.

6. The device according to claim 1, wherein the heat exchanger in the regeneration pipe is dimensioned such that the temperature of the regeneration gas at the inlet of the regeneration section is between 130 and 150° C.

7. The device according to claim 1, wherein the dryer has first and second regeneration phases, said first regeneration phase using regeneration gas that is supplied via a first regeneration pipe, and a second subsequent regeneration phase that further dries the drying agent and for which the regeneration gas is supplied via a second regeneration pipe;
wherein said gas-gas heat exchanger is disposed in at least one of the two regeneration pipes or in both regeneration pipes.

8. The device according to claim 7, wherein said gas-gas heat exchanger is provided at least in the second regeneration pipe.

9. The device according to claim 7, wherein the first regeneration pipe is connected to the outlet pipe of the compressor device and taps off the regeneration gas for the first regeneration phase.

10. The device according to claim 9, wherein for the first regeneration phase, around 40% is branched off from the gas flow that is compressed by the compressor device, and, for the second regeneration phase, around 10% is branched off from the flow of compressed gas that is supplied by the device for compressing and drying gas.

11. The device according to claim 9, wherein there are two regeneration phases and for each regeneration phase there is a separate gas-gas heat exchanger, and both heat exchangers are each incorporated separately in a pressure pipe of a different compressor element.

12. The device according to claim 9, wherein there are two regeneration phases and there is a separate gas-gas heat exchanger for each regeneration phase, and both heat exchangers are located in the same pressure pipe between two successive compressor elements.

13. The device according to claim 12, wherein both heat exchangers are connected in parallel in the pressure pipe.

14. The device according to claim 13, wherein the outlet of the regeneration section is connected via an ejector to the inlet of the drying section.

15. The device according to claim 7, wherein the second regeneration pipe is connected to the outlet of the drying section of the dryer to thereby tap off regeneration gas for the second regeneration phase.

16. The device according to claim 1, wherein the dryer is a rotary type having a drum filled with a drying agent that is alternately guided through a drying section and then through at least a first regeneration section upon rotation of the drum.

17. The device according to claim 1, including an intercooler or an aftercooler provided in the pressure pipe or in the outlet pipe including the heat exchanger and that the gas-gas heat exchanger is located upstream from the intercooler or aftercooler.

18. The device according to claim 1, wherein the outlet of the regeneration section is connected via a cooler to the inlet of the drying section.

19. A method for compressing and drying gas by a device that includes a compressor device and a dryer that uses a drying agent for drying gas connected thereto, said compressor device compressing the gas in two or more successive stages using two or more compressor elements, including a low-pressure stage and one or more subsequent high-pressure stages, and discharging the compressed gas through the dryer via an outlet pipe in which an aftercooler is incorporated to dry the compressed gas, said aftercooler including a drying section which contains a drying agent through which the gas is guided, and which includes an outlet for supplying compressed and dried gas, said dryer also including a regeneration section that dries the moist drying agent by using a regeneration gas that is guided through it via an inlet and an outlet, comprising the steps:

heating a part of the regeneration gas by a gas-gas heat exchanger having a primary part through which the regeneration gas is caused to flow and a secondary part that is fed by a pressure side of the compressor element that comprises the low-pressure stage.

* * * * *